US006382017B1

(12) United States Patent
Majkowski et al.

(10) Patent No.: US 6,382,017 B1
(45) Date of Patent: May 7, 2002

(54) EVAPORATIVE EMISSION LEAK DETECTION METHOD WITH VAPOR GENERATION COMPENSATION

(75) Inventors: Stephen F. Majkowski, Rochester Hills; Kenneth M. Simpson, Howell, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/437,661

(22) Filed: Nov. 10, 1999

(51) Int. Cl.[7] ................................................ G01M 3/04
(52) U.S. Cl. ....................................... 73/49.7; 73/118.1
(58) Field of Search ................................ 123/520, 518, 123/519; 73/40, 49.7, 118.1, 49.2

(56) References Cited

U.S. PATENT DOCUMENTS 5,261,379 A * 11/1993 Lipinski et al. ............. 123/520
5,327,873 A * 7/1994 Ohuchi et al. .............. 123/520
5,396,873 A * 3/1995 Yamanaka et al. .......... 123/520
5,411,004 A * 5/1995 Busato et al. ............... 123/520
5,427,075 A * 6/1995 Yamanaka et al. .......... 123/520
5,467,641 A * 11/1995 Williams et al. ............. 73/49.7
5,490,414 A * 2/1996 Durschmidt et al. ......... 73/49.2
5,572,981 A * 11/1996 Pfleger et al. .............. 123/698
5,637,788 A * 6/1997 Remboski ................ 73/40.5 R
5,679,890 A * 10/1997 Shinohara et al. ......... 73/118.1
5,699,775 A * 12/1997 Azuma ....................... 123/520
5,750,888 A * 5/1998 Matsumoto et al. ....... 73/118.1
6,041,648 A * 3/2000 Angermaier et al. ....... 73/118.1

* cited by examiner

*Primary Examiner*—Hezron Williams
*Assistant Examiner*—Charles D. Garber
(74) *Attorney, Agent, or Firm*—Vincent A. Cichosz

(57) ABSTRACT

An improved method of detecting evaporative emission system leaks, wherein first and second changes in closed-system fuel tank pressure due to vapor generation are measured respectively prior to and after the leak testing, and wherein the larger of the first and second pressure changes is used to adjust the pressure measurements taken during leak testing, or to invalidate the diagnostic if the vapor generation exceeds a threshold. The first vapor generation test occurs at the beginning of the driving cycle when there has been no significant disturbance of the vapor equilibrium in the fuel tank, and thereby provides an indication vapor generation due to volatility of the fuel. The second vapor generation test occurs well into the driving cycle, and provides an indication of vapor generation due to fuel heating and sloshing.

12 Claims, 4 Drawing Sheets

EVAPORATIVE EMISSION LEAK DETECTION METHOD WITH VAPOR GENERATION COMPENSATION

TECHNICAL FIELD

The present invention relates to leak detection in an automotive evaporative emission system, and more particularly to a detection method that takes into account the vapor generation characteristics of the system.

BACKGROUND OF THE INVENTION

In automotive evaporative emission systems, fuel vapor generated in the vehicle fuel tank is captured in a charcoal-filled canister and subsequently supplied to the engine air intake through a solenoid purge valve. Since the effectiveness of the system can be significantly impaired by faulty operation of a component or by a leak in one or more of the hoses or components, the engine controller is generally programmed to carry out a number of diagnostic algorithms for detecting such failures. If faulty operation is detected, the result is stored and a "check engine" lamp is activated to alert the driver so that corrective action can be taken.

Experience has shown that evaporative system leaks can be particularly difficult to reliably detect and diagnose due to variability of fuel characteristics, driving schedules, and environmental conditions. While leaks can theoretically be detected by closing off the air vent, drawing the system below atmospheric pressure with engine vacuum, and then monitoring the change in system pressure, the results are subject to misinterpretation due to unmeasured effects such as vapor generation in the fuel tank. Accordingly, what is needed is a method of reliably detecting evaporative emission system leaks.

SUMMARY OF THE INVENTION

The present invention is directed to an improved method of detecting evaporative emission system leaks, wherein first and second changes in closed-system pressure due to vapor generation are measured respectively prior to and after the leak testing, and wherein the larger of the first and second pressure changes is used to adjust the pressure measurements taken during leak testing, or to invalidate the diagnostic if the vapor generation exceeds a threshold. The first vapor generation test occurs at the beginning of the driving cycle when there has been no significant disturbance of the vapor equilibrium in the fuel tank, and thereby provides an indication of vapor generation due to volatility of the fuel. The second vapor generation test occurs well into the driving cycle, and provides an indication of vapor generation due to fuel heating and sloshing.

DESCRIPTION OF THE PREFERRED EMBODIMENT

Figure 1:
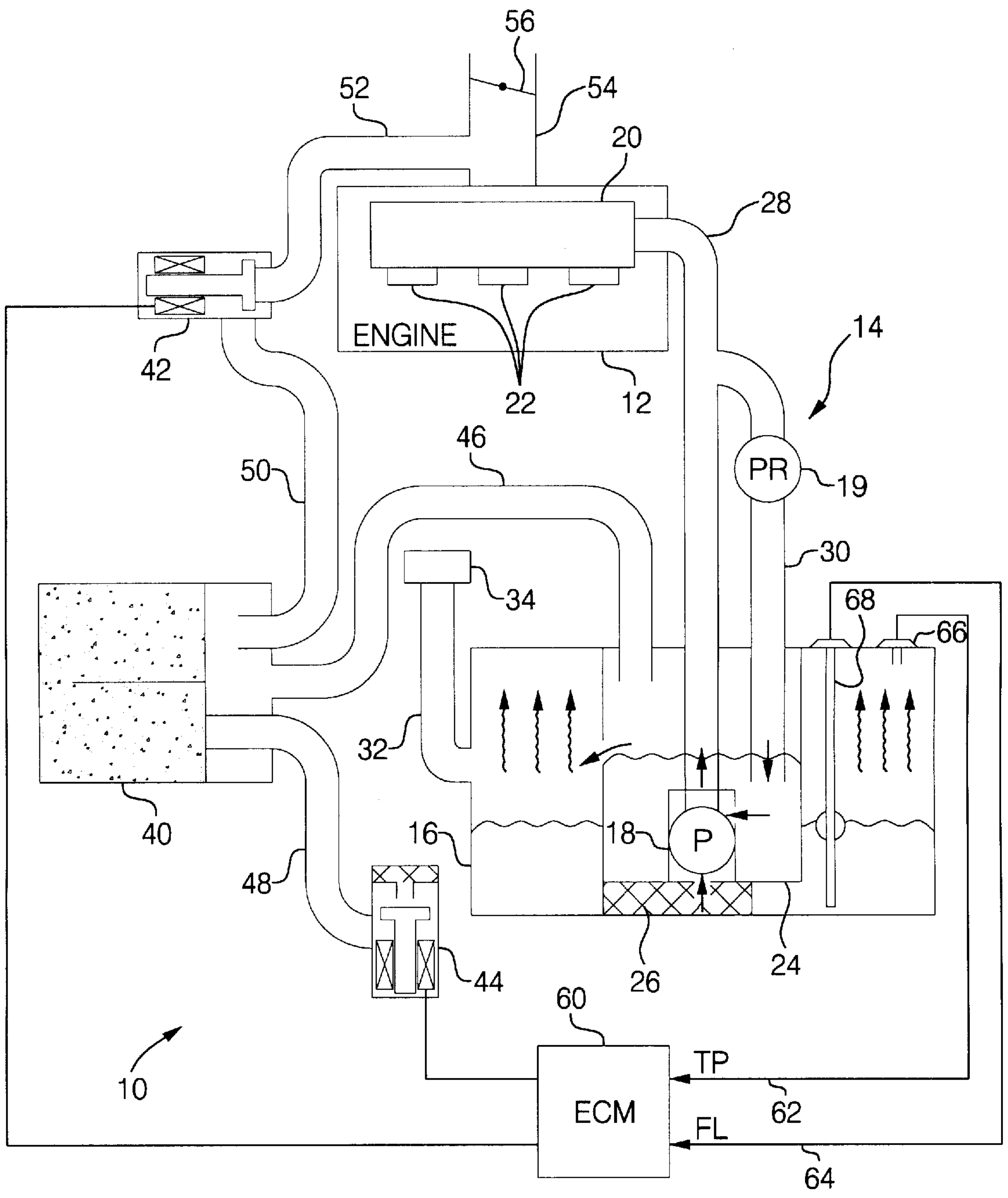
FIG. 1 is a diagram of an automotive evaporative emission system according to this invention, including a microprocessor-based engine control module (ECM).

Referring to FIG. 1, the reference numeral 10 generally designates an evaporative emission system for an automotive engine 12 and fuel system 14. The fuel system 14 includes a fuel tank 16, a fuel pump (P) 18, a pressure regulator (PR) 19, an engine fuel rail 20, and one or more fuel injectors 22. The fuel tank 16 has an internal chamber 24, and the pump 18 draws fuel into the chamber 24 through a filter 26, as generally indicated by the arrows. The fuel line 28 couples the pump 18 to the fuel rail 20, and the pressure regulator 19 returns excess fuel to chamber 24 via fuel line 30. Fuel is supplied to the tank 16 via a conventional filler pipe 32 sealed by the removable fill cap 34.

The evaporative emission system 10 includes a charcoal canister 40, a solenoid purge valve 42 and a solenoid air vent valve 44. The canister 40 is coupled to fuel tank 16 via line 46, to air vent valve 44 via line 48, and to purge valve 42 via line 50. The air vent valve 44 is normally open so that the canister 40 collects hydrocarbon vapor generated by the fuel in tank 16, and in subsequent engine operation, the normally closed purge valve 42 is modulated to draw the vapor out of canister 40 via lines 50 and 52 for ingestion in engine 12. To this end, the line 52 couples the purge valve 42 to the engine intake manifold 54 on the vacuum or downstream side of throttle 56.

The air vent valve 44 and purge valve 42 are both controlled by a microprocessor-based engine control module (ECM) 60, based on a number of input signals, including the fuel tank pressure (TP) on line 62 and the fuel level (FL) on line 64. The fuel tank pressure is detected with a conventional pressure sensor 66, and the fuel level is detected with a conventional fuel level sender 68. Of course, the ECM 60 controls a host of engine related functions, such as fuel injector opening and closing, ignition timing, and so on.

In general, the ECM 60 diagnoses leaks in the evaporative emission system 10 by suitably activating the solenoid valves 42 and 44, and monitoring the fuel tank pressure TP. According to the invention, the method involves a first vapor generation test conducted at the beginning of the driving cycle, a leak test of the evaporative emission system, and a second vapor generation test conducted after the leak test has been completed. The first and second vapor generation tests are carried out by setting the valves 42 and 44 to their closed states to establish a closed system, and monitoring the TP signal for pressure changes due to vapor generation in the fuel tank 16. The leak test is carried out by setting the valve 44 to its closed state, modulating the valve 42 to establish a below atmospheric pressure in the fuel tank 16, setting the valve 42 to its closed state to establish a closed system, and then monitoring the TP signal for pressure changes due to an atmospheric leak into the closed system, such as a leak in the fuel tank cap 34 or the pipes 46, 48 or 50.

Figure 2A:
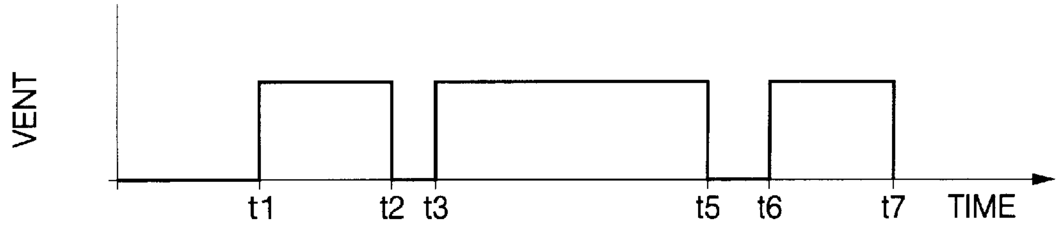
FIG. 2, Graphs A–C, graphically depict the operation of the diagnostic method of this invention.
Figure 2B:
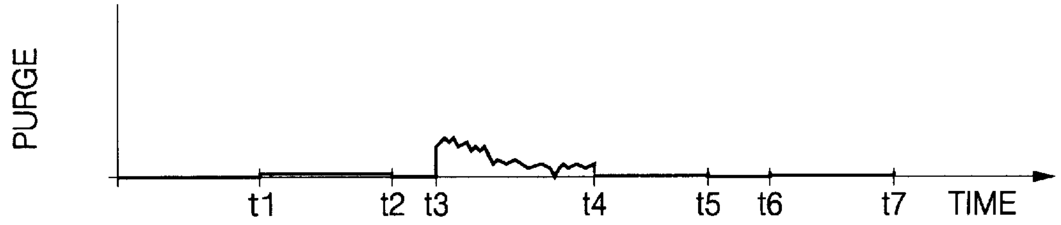
Figure 2C:
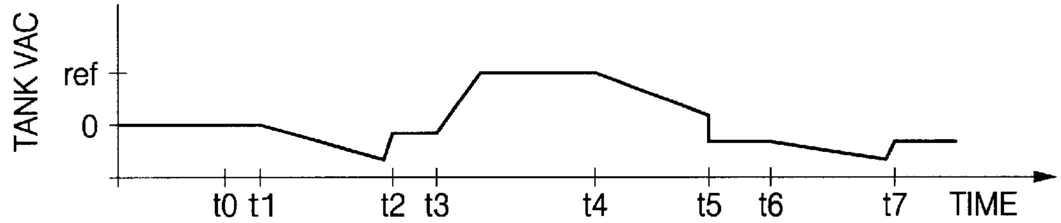

The above method is graphically depicted in FIG. 2, where Graph A depicts the state of the vent valve 44, Graph B depicts the state of the purge valve 42, and Graph C depicts a tank vacuum signal developed from the TP signal, all as a common function of driving cycle time. By convention, the vacuum signal of Graph C depicts increasing vacuum as a positive quantity, and increasing pressure as a negative quantity.

The driving cycle is initiated at time t0, and the first vapor generation test is initiated shortly thereafter at time t1; this involves activating the normally open vent valve 44, and deactivating the normally closed purge valve 42, as seen in Graphs A and B, respectively. During the interval t1–t2, the duration of which may be determined in advance by calibration, the tank vacuum signal (Graph C) may fall slightly (pressure rise) due to vapor generation, depending on the fuel volatility. The change in pressure is recorded as a slope (i.e., change in pressure/time, also referred to herein as PRE-VG SLOPE), and the vent valve 44 is then re-opened at time t2, allowing the system pressure to return to its normal level.

The leak test is subsequently conducted in the interval t3–t5. In the illustrated embodiment, the vent valve 44 is activated to a closed state, and the purge valve 42 is modulated to draw the tank vacuum below atmospheric pressure to a reference pressure (REF), and to maintain the reference pressure until the enable conditions for the leak test are met at time t4. At such point, the purge valve 42 is deactivated to establish a closed system, and the change in pressure (which may be due to a leak or vapor generation) is monitored over a predefined interval t4–t5. The change in pressure is recorded as a slope (i.e., change in pressure/time, also referred to herein as LEAK TEST SLOPE), and the vent valve 44 is then re-opened at time t5, allowing the system pressure to return to its normal level.

The second vapor generation test is initiated at time t6, shortly after completion of the leak test. As with the first vapor generation test, the normally open vent valve 44 is activated, and the normally closed purge valve 42 is deactivated, as seen in Graphs A and B, respectively. During the interval t6–t7, the duration of which may be determined in advance by calibration, the tank vacuum signal may fall slightly (pressure rise) due to vapor generation, this time depending primarily on the degree of fuel sloshing and heating. The change in pressure is recorded as a slope (i.e., change in pressure/time, also referred to herein as POST-VG SLOPE), and the vent valve 44 is then re-opened at time t7, allowing the system pressure to return to its normal level, and completing the diagnostic measurements.

According to the invention, the pressure change measured during the leak test is compensated based on the larger of the two slopes determined during the first and second vapor generation tests. Since the first vapor generation test occurs when there has been no significant disturbance of the vapor equilibrium in the fuel tank, the PRE-VG SLOPE provides an indication of vapor generation primarily due to volatility of the fuel. Since the second vapor generation test occurs well into the driving cycle, the POST-VG SLOPE provides an indication of vapor generation primarily due to fuel heating and sloshing. The vapor generation slopes PRE-VG SLOPE and POST-VG SLOPE are each compared to upper and lower thresholds for the purpose of disabling small and/or very small leak detection, and the larger of the PRE-VG SLOPE and the POST-VG SLOPE is used to adjust the LEAK TEST SLOPE to compensate for vapor generation. For purposes of this description, a very small leak is defined as a leak equivalent to an opening having a diameter of 0.020", and a small leak is defined as a leak equivalent to an opening having a diameter of 0.040".

Figure 3:
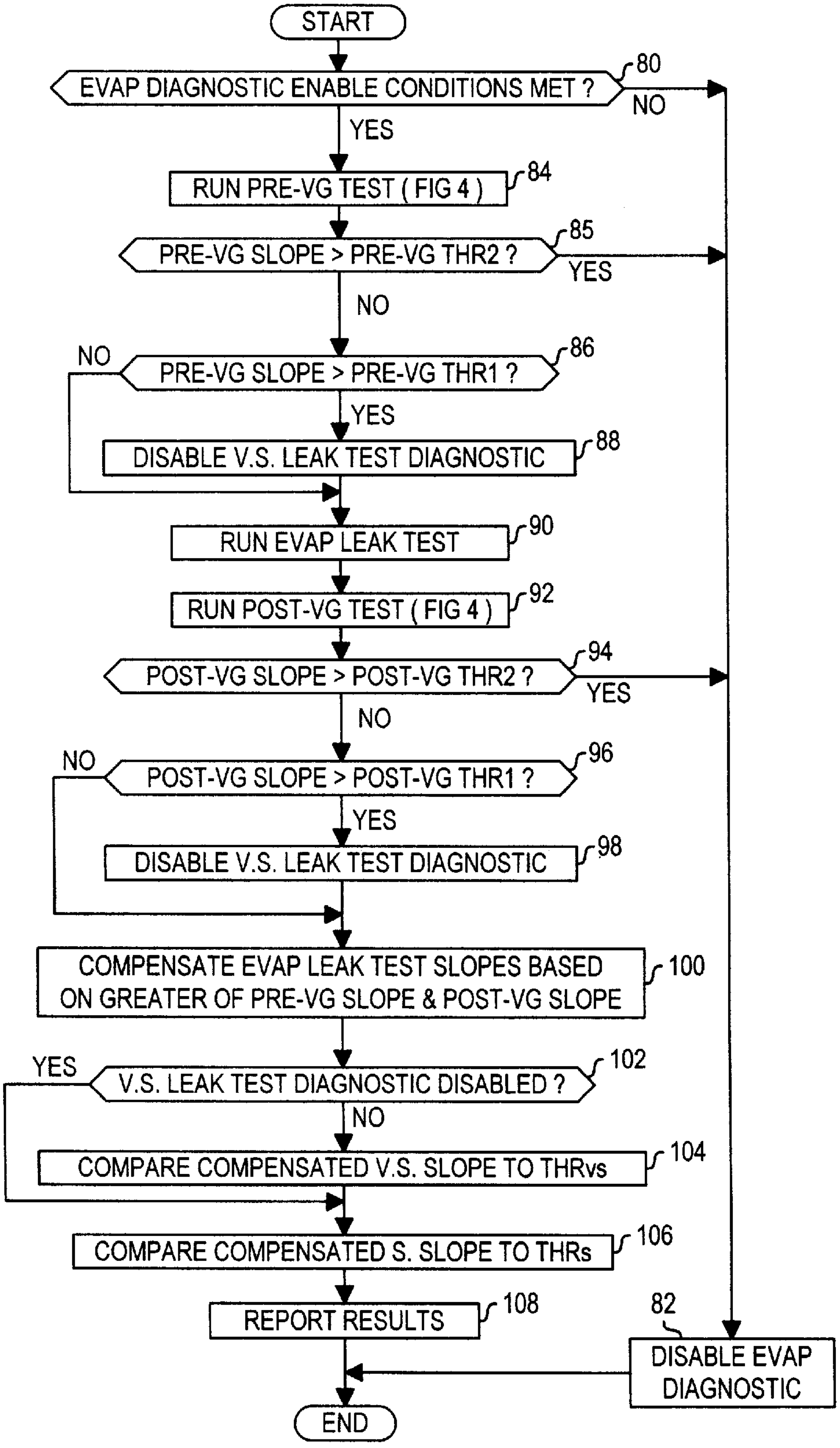
FIGS. 3 and 4 are flow diagrams representative of computer program instructions executed by the ECM of FIG. 1 in carrying out the diagnostic method of this invention.
Figure 4:
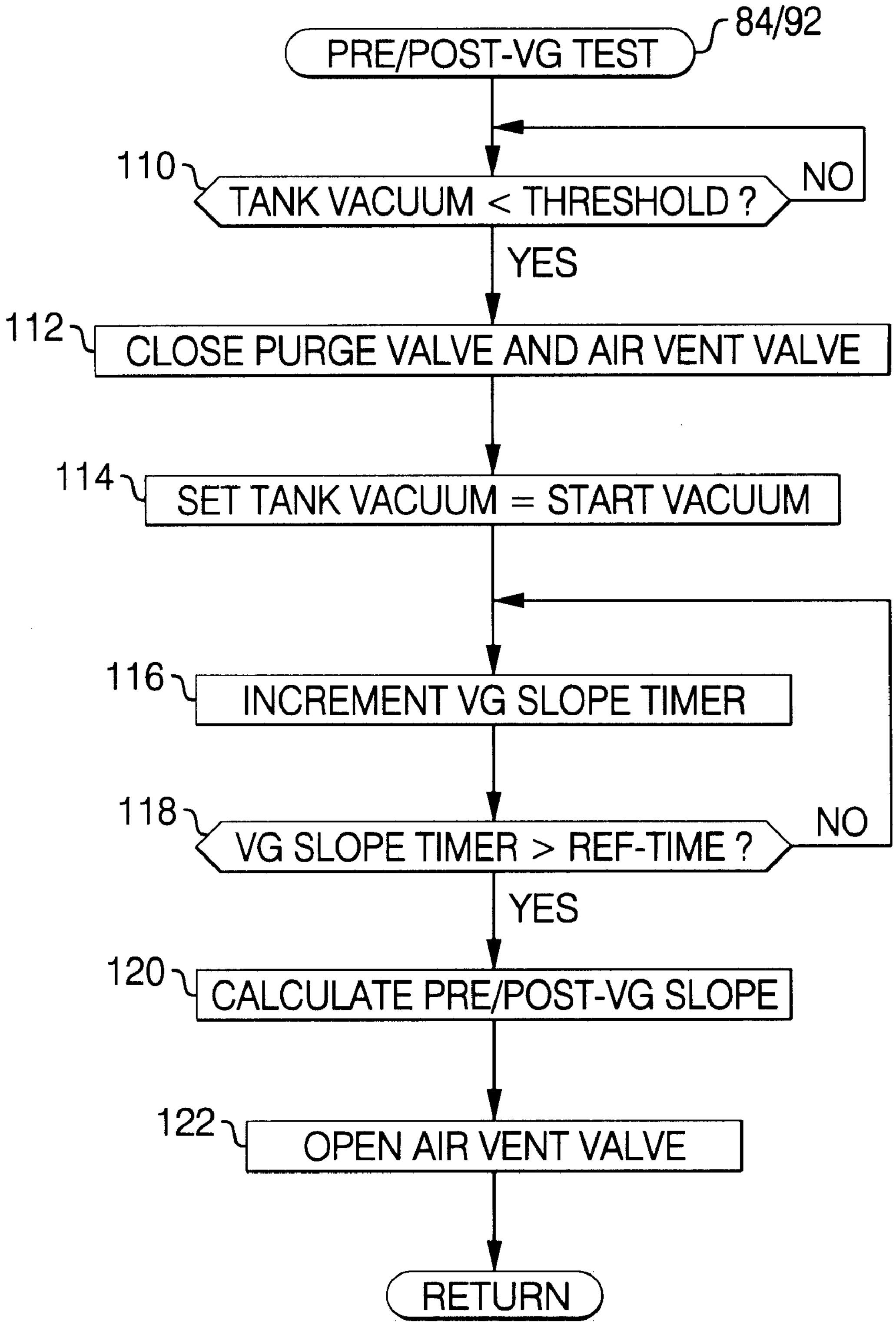

FIGS. 3 and 4 are flow diagrams representative of computer program instructions executed by the ECM 60 for carrying out the above-described diagnostic method. FIG. 3 describes a diagnostic routine that is executed during a diagnostic interval, and FIG. 4 details a portion of the flow diagram of FIG. 3 concerning vapor generation testing.

Referring to FIG. 3, block 80 of the diagnostic routine is first executed to determine if the evaporative diagnostic enable conditions have been met. This may involve, for example, determining if the engine coolant temperature is within a predefined range, if the difference between the coolant temperature and the inlet air temperature is within a given range, if the measured fuel level is within a given range, and if the barometric pressure is within a given range. If one or more of the conditions is not met, the block 82 is executed to disable the evaporative leak diagnostic. If all of the conditions are met, the block 84 is executed to run the first vapor generation test. Once the first vapor generation test has been completed, the block 85 determines if the measured slope (PRE-VG SLOPE) is greater than an upper threshold rate PRE-VG_THR2. If so, the fuel is too volatile to reliably detect the existence of either small or very small leaks, and the block 82 is executed to disable the evaporative diagnostic. If PRE-VG SLOPE is lower than the upper threshold PRE-VG_THR2, but higher than a lower threshold rate PRE-VG_THR1, as determined at block 86, the fuel is too volatile to reliably detect the existence of a very small leak, and the block 88 is executed to disable the very small leak test diagnostic. The block 90 is then executed to run the leak test. As described above in reference to FIG. 2, the result of the leak test is a detected change in pressure or slope that may be due to a leak in the otherwise closed system. Upon completion of the leak test, block 92 is executed to run the second vapor generation test. Once the second vapor generation test has been completed, the block 94 determines if the measured slope (POST-VG SLOPE) is greater than an upper threshold rate POST-VG_THR2. If so, there is too much vapor generation to detect the existence of either a small or very small leak, and the block 82 is executed to disable the evaporative system leak diagnostic. Block 96 determines if the measured slope (POST-VG SLOPE) is greater than a lower threshold rate POST-VG_THR1. If so, there is too much vapor generation to detect the existence of a very small leak, and the block 98 is executed to disable the very small leak test diagnostic. The block 100 is then executed to compensate the result of the leak test based on the greater of PRE-VG SLOPE and POST-VG SLOPE, thereby compensating the measured decrease in vacuum for vapor generation effects. If the very small leak test diagnostic has not been disabled, as determined at block 102, the blocks 104 and 106 are executed to compare the compensated leak test slopes (S. SLOPE, V.S. SLOPE) to respective small and very small thresholds THRs, THRvs. The respective leak test is considered to have been failed if the compensated slope exceeds the respective threshold. If block 102 is answered in the affirmative, execution of the block 104 is skipped. And finally, the results of the tests are reported at block 108.

The flow diagram of FIG. 4 further details the method of carrying out the first and second vapor generation tests, and is intended to apply to either such test. Thus, both the first and second vapor generation tests (blocks 84 and 92 of FIG. 3) involve a similar series of steps. First, block 110 is executed to determine if the system vacuum is below a threshold. When the sensed vacuum falls below the threshold, the block 112 is executed to command the purge valve 42 and the vent valve 44 to their closed states, and block 114 stores the current tank vacuum as the initial value of the test. The block 116 then increments a slope timer, and when block 118 detects that the timer has reached a reference time REF-TIME, the block 120 calculates the respective slope PRE-VG SLOPE or POST-VG SLOPE. Finally, block 122 is executed to open the vent valve 44, completing the respective vapor generation test.

In summary, the diagnostic method of the present invention provides a reliable method of detecting the existence of a leak in an evaporative emission system, primarily by compensating the leak measurements for the influences of vapor generation due to fuel volatility, fuel heating and sloshing. While the present invention has been described in reference to the illustrated embodiment, it is expected that various modifications will occur to those skilled in the art. For example, there may be more than two vapor generation tests, and various factors may be applied to the vapor generation slopes prior to compensation of the leak test slope to account for differences in the system pressure. Accordingly, it will be understood that methods incorporating these and other modifications may fall within the scope of this invention, which is defined by the appended claims.

What is claimed is:

1. A method of detecting a leak in an automotive evaporative emission system including the steps of:

repeatedly measuring a pressure in the system;

conducting a first vapor generation test substantially at the beginning of a driving cycle by closing all venting of the system and monitoring a first change in the measured pressure;

conducting a leak test to detect an apparent leak in the system by bringing the measured pressure to a reference value below atmospheric pressure, and then determining a rate of change of the measured pressure;

conducting a second vapor generation test after completion of the leak test by closing all venting of the system and monitoring a second change in the measured pressure;

compensating the determined rate of change based upon the greater of the first and second pressure changes; and determining the existence of a system leak when the compensated rate of change exceeds a threshold.

2. The method of claim 1, wherein the first pressure change monitored during the first vapor generation test is due primarily to a volatility of fuel residing in the system, and the second pressure change monitored during the second vapor generation test is due primarily to heating and sloshing of fuel residing in the system.

3. The method of claim 1, including the steps of:

comparing the first pressure change to an upper threshold; and disabling the detecting of a leak if the first pressure change exceeds the upper threshold.

4. A method of detecting leaks in an automotive evaporative emission system, including leak tests to detect a first-sized leak and a second-sized leak, with the second-sized leak being smaller than the first-sized leak, the method including the steps of:

repeatedly measuring a pressure in the system;

conducting a first vapor generation test substantially at the beginning of a driving cycle by closing all venting of the system and monitoring a first change in the measured pressure;

comparing the first pressure change to upper and lower thresholds;

disabling the leak tests for both first-sized and second-sized leaks if the first pressure change exceeds the upper threshold;

bringing the measured pressure to a reference value below atmospheric pressure, and then determining a rate of change of the measured pressure;

conducting a second vapor generation test after completion of the leak test by closing all venting of the system and monitoring a second change in the measured pressure;

compensating the determined rate of change based upon the greater of the first and second pressure changes; and detecting the existence of both first-sized leaks and second-sized leaks based on the compensated rate of change if the first pressure change is less than the lower threshold; and detecting the existence of a first-sized leak but not a second-sized leak based on the compensated rate of change if the first pressure change exceeds the lower threshold but not the upper threshold.

5. The method of claim 1, including the steps of:

comparing the second pressure change to an upper threshold; and disabling the detecting of a leak if the second pressure change exceeds the upper threshold.

6. A method of detecting leaks in an automotive evaporative emission system, including leak tests to detect a first-sized leak and a second-sized leak, with the second-sized leak being smaller than the first-sized leak, the method including the steps of:

repeatedly measuring a pressure in the system;

conducting a first vapor generation test substantially at the beginning of a driving cycle by closing all venting of the system and monitoring a first change in the measured pressure;

bringing the measured pressure to a reference value below atmospheric pressure, and then determining a rate of change of the measured pressure;

conducting a second vapor generation test after completion of the leak test by closing all venting of the system and monitoring a second change in the measured pressure;

compensating the determined rate of change based upon the greater of the first and second pressure changes;

comparing the second pressure change to upper and lower thresholds;

disabling the leak tests for both first-sized and second-sized leaks if the second pressure change exceeds the upper threshold;

detecting the existence of both first-sized leaks and second-sized leaks based on the compensated rate of change if the second pressure change is less than the lower threshold; and detecting the existence of a first-sized leak but not a second-sized leak based on the compensated rate of change if the second pressure change exceeds the lower threshold but not the upper threshold.

7. A method of detecting a leak in an automotive evaporative emission system by repeatedly measuring a pressure in the system, and conducting a leak test by bringing the measured pressure to a reference value below atmospheric pressure, and then determining a rate of change of the measured pressure, the improvement comprising the steps of:

conducting a first vapor generation test substantially at the beginning of a driving cycle, and prior to conducting the leak test, by closing all venting of the system and monitoring a first change in the measured pressure; and conducting a second vapor generation test after completion of the leak test by closing all venting of the system and monitoring a second change in the measured pressure;

compensating the determined rate of change based upon the greater of the first and second pressure changes; and detecting the existence of a system leak when the compensated rate of change exceeds a threshold.

8. The improvement of claim 7, wherein the first pressure change monitored during the first vapor generation test is due primarily to a volatility of fuel residing in the system, and the second pressure change monitored during the second vapor generation test is due primarily to heating and sloshing of fuel residing in the system.

9. The improvement of claim 7, including the step of:

comparing the first change in the measured pressure to a threshold; and disabling the detecting of a system leak if the first change exceeds the threshold.

10. A method of leak testing an automotive evaporative emission system by repeatedly measuring a pressure in the system, and conducting a leak test by bringing the measured pressure to a reference value below atmospheric pressure, and then determining a rate of change of the measured pressure, wherein the leak test includes tests to detect a first-sized leak and a second-sized leak, with the second-sized leak being smaller than the first-sized leak, the improvement comprising the steps of:

conducting a first vapor generation test substantially at the beginning of a driving cycle, and prior to conducting the leak test, by closing all venting of the system and monitoring a first change in the measured pressure; and conducting a second vapor generation test after completion of the leak test by closing all venting of the system and monitoring a second change in the measured pressure;

compensating the determined rate of change based upon the greater of the first and second pressure changes;

comparing the first pressure change to upper and lower thresholds;

disabling the detecting of both first-sized and second-sized leaks if the first pressure change exceeds the upper threshold;

detecting the existence of both first-sized leaks and second-sized leaks based on the compensated rate of change if the first pressure change is less than the lower threshold; and detecting the existence of a first-sized leak but not a second-sized leak based on the compensated rate of change if the first pressure change exceeds the lower threshold but not the upper threshold.

11. The improvement of claim 7, including the step of:

comparing the second change in the measured pressure to a threshold; and disabling the detecting of a system leak if the second change exceeds the threshold.

12. A method of leak testing an automotive evaporative emission system by repeatedly measuring a pressure in the system, and conducting a leak test by bringing the measured pressure to a reference value below atmospheric pressure, and then determining a rate of change of the measured pressure, wherein the leak test includes tests to detect a first-sized leak and a second-sized leak, with the second-sized leak being smaller than the first-sized leak, the improvement comprising the steps of:

conducting a first vapor generation test substantially at the beginning of a driving cycle, and prior to conducting the leak test, by closing all venting of the system and monitoring a first change in the measured pressure; and conducting a second vapor generation test after completion of the leak test by closing all venting of the system and monitoring a second change in the measured pressure;

compensating the determined rate of change based upon the greater of the first and second pressure changes;

comparing the second pressure change to upper and lower thresholds;

disabling the detecting of both first-sized and second-sized leaks if the second pressure change exceeds the upper threshold;

detecting the existence of both first-sized leaks and second-sized leaks based on the compensated rate of change if the second pressure change is less than the lower threshold; and detecting the existence of a first-sized leak but not a second-sized leak based on the compensated rate of change if the second pressure change exceeds the lower threshold but not the upper threshold.

* * * * *